Oct. 9, 1956 J. E. CASEY 2,766,393

COLOR TELEVISION RECEIVER

Filed Feb. 2, 1955

INVENTOR.
James E. Casey,
BY
Mueller & Aichele
Att'ys.

United States Patent Office 2,766,393
Patented Oct. 9, 1956

2,766,393

COLOR TELEVISION RECEIVER

James E. Casey, Des Plaines, Ill., assignor to Motorola, Inc., Chicago, Ill., a corporation of Illinois Application February 2, 1955, Serial No. 485,749

5 Claims. (Cl. 313—77)

This invention relates to color television receivers and more particularly to an improved convergence yoke assembly for use in such receivers.

It is usual for present day color television receivers to employ cathode ray reproducing tubes wherein a plurality of electron beams are emitted by spaced sources at one end of the tube and are directed at, and scanned across, a viewing screen at the other end of the tube. This viewing screen may be composed of closely spaced groups of three phosphor dots or triads with each dot in a triad producing a certain primary color when impinged upon by a beam. Therefore, each triad may consist of an element of a complete color image, which element assumes a hue corresponding to the relative excitation of the three phosphor dots in the particular triad. The human eye may then view a complete color image on the screen which in reality consists of many triads each of a certain hue. The three electron beams are, of course, separately modulated by different components of the received color television signal to excite the triads so that they produce light of a color corresponding to an element of the televised scene.

With the three electron beams being emitted from spaced sources and scanned across a comparatively flat screen by a common deflection system, as is customary in the above described receiver, it is apparent that the beams will not necessarily strike the proper dot in each triad during the scanning operation. This is so since various points of the screen will be at different distances from the beam sources and therefore the beams will travel distances to the different triads. Accordingly, correction must be applied to each beam for proper reproduction. This is usually achieved by dynamic convergence apparatus which provides a varying field to maintain proper registration of the beams during scanning. In practice it is common to provide both an adjustable fixed or static field and an adjustable dynamically varying field so that the beams may be properly converged in a certain static position of the screen by the fixed field, as well as converged during the scanning operation by the dynamic field.

Apparatus providing the required resultant convergence field for proper registration may include three yoke coils with respective cores each extending radially and disposed around the neck of a cathode ray tube, and with each coil-core unit being adjacent the path of one of the three electron beams. A permanent magnet may also be associated with each coil-core unit to provide the fixed or static field. It is apparent that such a yoke structure must be firmly and accurately positioned in order that reliable and stable convergence be obtained. However, it may occasionally be desirable to free the yoke from the neck of the tube during, for example, replacement of the cathode ray tube. Furthermore, since the cores of the convergence coils are formed of metal having suitable magnetic properties and are commonly installed in engagement with the glass neck of the tube, jarring of the receiver during shipping and handling could result in shattering of the cathode ray tube by the cores.

It is accordingly, an object of the present invention to provide a convergence yoke assembly for a color television receiver tri-beam cathode ray tube which may be easily disengaged from the neck of the tube so that during shipping and handling of the receiver the yoke structure will not damage the cathode ray tube by jarring against it.

Another object of the invention is to provide improved yoke shifting apparatus for use with a color television receiver tri-beam ray tube, which apparatus may firmly retain associated radial coil-core units against the tube neck or in positions spaced therefrom so as to permit safe shipment of the receiver and expedient replacement of the cathode ray tube.

A feature of the invention consists of an improved convergence yoke structure for a color television receiver picture tube with angularly spaced radial field producing devices which are slidably mounted on a frame constructed to be positioned on the neck of the picture tube, with the field producing devices being adapted to be moved radially away from the tube neck to an inoperative position and of being retained in such position to lessen the possibility of damage to the tube during handling of the receiver.

Another feature of the invention is the provision of an improved yoke apparatus for a color television receiver tri-beam cathode ray tube including three slidably mounted field producing, or coil-core, units, the units being angularly spaced around the neck of the tube and extending radially therefrom, and the units being slidably mounted with a spring bias tending to force them into engagement with the neck of a cathode ray tube; and which apparatus also includes a lever-actuated rotatable ring surrounding the tube neck and having cam portions adapted to slide the units outwardly to retain them in an inoperative position spaced from the neck.

Further objects, features and the attending advantages thereof will be apparent upon consideration of the following description when taken in conjunction with the drawings in which.

The invention includes convergence yoke apparatus for a tri-beam cathode ray tube as used in color television receivers. A frame adapted to be positioned around the neck of the tube, is used to support three angularly spaced radially extending convergence coils with associated cores in engagement with the tube neck and with each core adjacent the path of a corresponding one of the three electron beams. The coil-core units are spring biased toward the tube neck and are secured to brackets which are slidably mounted on the frame so that they may be moved radially outwardly from the neck to an inoperative position during replacement of the tube or shipping of the receiver. In order to accomplish such a control of the coil-core units and to retain them in disengagement from the neck, a lever-actuated ring is rotatably mounted on the frame concentric with the tube neck, and the ring has cam portions on its periphery which are adapted to engage pins on the coil-core units and to slide the brackets and the coil-core units radially against the spring biasing as the ring is rotated. Thus the coil-core units may be placed in engagement with the cathode ray tube neck for operation of the set or conveniently disengaged therefrom for shipping or servicing purposes.

Figure 1:
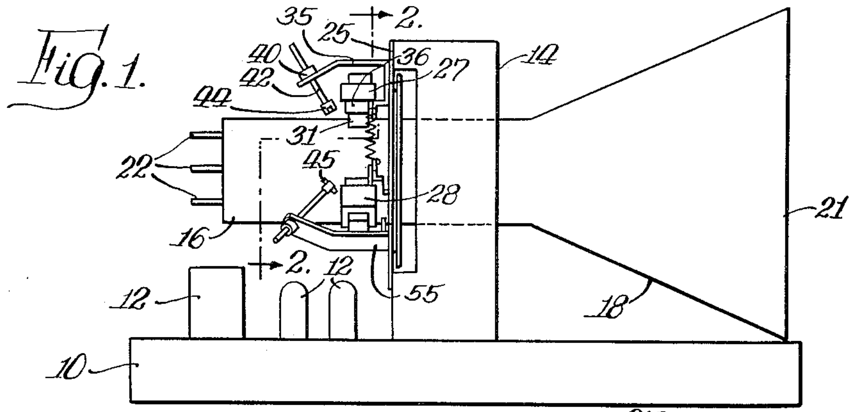
Fig. 1 is an elevational view representing the chassis of a color television receiver and illustrating the yoke structure of the present invention.

Referring now to Fig. 1, there is shown a representation of a color television receiver chassis 10 upon which various electrical components 12 are supported. Also disposed upon the chassis is a support 14 through which the neck 16 of the cathode ray tube 18 extends. Cathode ray tube 18 includes a screen 21 upon which an image is reproduced as well as connecting pins 22 which provide electrical connection to the beam producing apparatus within the tube. Cathode ray tube 18 is of the tri-beam type as used in most present day color television receivers. Support 14, in addition to providing a mounting for neck 16, also may include suitable known apparatus for deflecting the cathode ray beams so that they scan a raster on screen 21. Support 14 is also shown retaining a frame plate 25 to which convergence control apparatus is affixed.

The three coils 27, 28 and 29 together with their respective U-shaped cores 31, 32, 33 (Figs. 1 and 2) are angularly disposed 120° apart about the tube neck 16 with the respective cores each extending radially outwardly from the tube neck and positioned adjacent the path of a corresponding one of the three electron beams developed within the tube. Coils 27—29 are coupled to a suitable dynamic convergence circuit so that each coil-core unit may provide a dynamically varying field which maintains the electron beams in proper registry as they are scanned across the screen.

Referring now specifically to Fig. 1, it may be seen that core 31 which supports coil 27 is affixed to one arm of a U-shaped bracket 35 by means of a clamp 36. The other arm of bracket 35 is extended and bent down toward coil 27 in order to provide suitable positioning means for a bearing 40 and slidable arm 42. A small permanent magnet 44 is affixed to one end of the arm 42, and the arrangement is such that magnet 44 may be moved manually toward and away from core 31. Magnet 44, accordingly, provides an adjustable fixed field for converging one electron beam with respect to another as they impinge upon a fixed point on screen 21, in this manner static convergence is obtained. Permanent magnets 45 and 46 (Fig. 2) are similarly provided for use in conjunction with coil-core units 28, 32, and 29, 33 respectively. Reference may be had to the co-pending application of Merlyn M. Armstrong, Serial No. 485,160, filed January 31, 1955, for a more complete description of the functioning of static convergence apparatus of this type. It may also be seen in Fig. 2 that brackets 55 and 56 serve to support the coil-core units 28, 32 and 29, 33, by means of the respective clamps 60 and 61, these latter clamps being similar to clamp 36 discussed previously which retains coil-core unit 27, 31. Plate 25, brackets 35, 55 and 56 as well as clamps 36, 60 and 61 should be formed of some non-magnetic material so that there will be no substantial influence on the fields produced by coils 27—29.

Figures 2, 3:
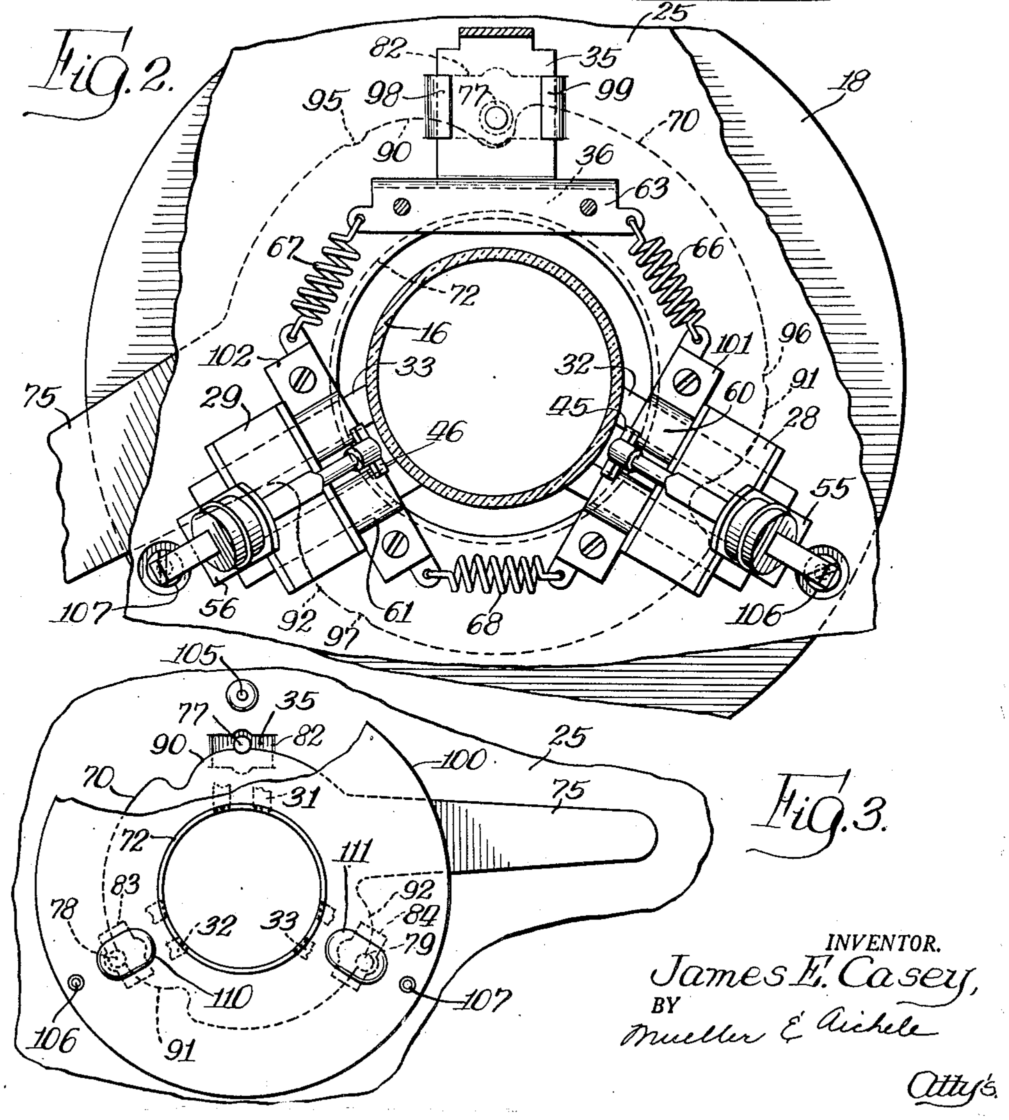
Fig. 2 is an enlarged and partly cut-away view of one side of the apparatus along the line 2—2 of Fig. 1 with a control in one position.
Fig. 3 is an enlarged and partially cut-away view of the opposite side of the apparatus when the control has been operated to a second position.

In Fig. 2 bracket 35 is shown partly in section in order to more clearly illustrate that it is slidably mounted upon the frame plate 25. It may be seen that a portion of bracket 35 is held against plate 25 by means of upturned lug portions 98, 99 which are integral parts of plate 25. Thus bracket 35 may be moved toward and away from the circular tube neck 16 along a radial line thereof. One of the arm portions of U-shaped bracket 35 terminates in a flanged section 63 to which the core 31 is secured by means of bracket 36 (Fig. 1) and the ends of flanged section 63 have apertures through which springs 66 and 67 are attached. Brackets 55 and 56 are similarly constructed and spring 66 is attached to flanged section 101 of bracket 55 and spring 67 is attached to flanged section 102 of bracket 56 in a manner corresponding to their attachment to flange 63. Spring 68 is likewise attached to flanged sections 101, 102 of brackets 55 and 56 so that springs 67—68 tend to bias the three brackets 35, 55 and 56 toward the center of tube neck 16 along radial lines thereof. Accordingly the various cores 31—33 may be brought into engagement with the outer surface of neck 16. This permits the field produced by the respective coil-core units and the associated permanent magnets to effect the maximum influence on the three beams within the cathode ray tube. However, as previously discussed, with the apparatus in such a position, replacement of the tube would be difficult and damage or shattering of the neck section could occur during handling and shipment of the completed television receiver as the cores may be jarred against the neck section.

To prevent the above situations, the present invention provides means for opening the coil-core units by sliding the U-shaped brackets 35, 55 and 56 outwardly away from neck 16 to a disengaged, inoperative position and retaining them in such a position. To accomplish this result, ring 70, having a central aperture concentric with and rotatable about flanged portion 72 which forms a central opening in plate 25 through which the tube neck 16 extends, is rotatably mounted on flange 72. Lever 75 is integral with ring 70 and may be used to cause rotation thereof. Each of the U-shaped brackets 35, 55 and 56 has respective pins 77, 78 and 79 extending through apertures 82, 83 and 84 in the frame plate. These apertures may be conveniently formed when guide lugs such as 98 and 99 are punched in plate 25. Pins 77—79 are adapted to be engaged by cam portions 90, 91 and 92 spaced about the periphery of ring 70. Therefore, in the position of ring 70 as shown in Fig. 2 with the sections of the cam portions having a minimum radius opposite the pins 77—79, the U-shaped brackets and the associated cores may be pulled snugly against the tube neck by means of the springs 66—68. However, as arm 75 is rotated in a clockwise direction as viewed in Fig. 2, the cam portions 90—91 will engage the respective pins 77—79 and cause spreading of the brackets and disengagement of the cores with the cathode ray tube neck. The open condition is shown in Fig. 3 and slight cutouts 95, 96 and 97 may be provided adjacent cam sections 90—92 to receive pins 77—79 in order that lever 75 must be forcibly rotated to release the brackets and permit return of the coil-core units to the inward position.

To retain ring 70 upon flange 72, a retaining plate 100 is secured to the frame plate 25 by means of suitable bolts at points 105, 106 and 107 so that only rotatable motion of ring 70 is possible. Suitable raised portions 110 and 111 are provided in retaining plate 100 so that pins 78 and 79 may move freely without engaging plate 100. A similar provision may be made for pin 77.

The invention provides, therefore, a convergence coil assembly for use with a tri-beam cathode ray tube which may firmly position the coil-core units in engagement with the cathode ray tube neck, or, by operation of a simple lever, move the units and retain them in a position spaced from the neck when this is desirable. Accordingly, through this simply and inexpensively constructed device, it is possible to provide beam convergence apparatus which permits expeditious replacement of the cathode ray tube and which will lessen the likelihood of shattering or damage to the tube when the television receiver is being handled or transported.

I claim:

1. Yoke apparatus for a cathode ray tube having a neck section, said apparatus including in combination, a plurality of magnetic field producing units, frame means for supporting said units in movable relation and in spaced angular positions around the neck section of the cathode ray tube, spring means for biasing said units radially inwardly into operative relation with the neck section, and manually operated means for simultaneously moving said units radially outwardly to an inoperative position spaced from the neck section and for retaining said units in such position against the action of said biasing means.

2. Yoke apparatus for a cathode ray tube having a neck section through which cathode ray beams pass, said apparatus including in combination, a support frame adapted to be positioned around the neck section of the cathode ray tube, a plurality of field producing means each angularly spaced on said support frame around a selected point, said field producing means being slidably mounted and movable outwardly from the neck section, resilient means for biasing said field producing means toward the neck section to position the same adjacent the neck section, and means engageable with said field producing means for moving the same against said resilient means so as to retain said plurality of field producing means spaced from the neck section of the cathode ray tube.

3. Yoke apparatus for a cathode ray tube having a neck section through which cathode ray beams pass, said apparatus including in combination, a support frame having a circular opening and adapted to be positioned on the neck section of the cathode ray tube, a plurality of field producing means each angularly spaced about said opening, said field producing means being slidably mounted along radii of said circular opening of said support frame, a lever-actuated disk rotatably supported around said circular opening and having a plurality of cam sections around the periphery thereof, each of said field producing means having a projecting portion engaging one of said cam sections of said lever-actuated disk, and spring means for biasing said field producing means toward the center of said circular opening and into close proximity to the neck section of the cathode ray tube, with rotation of said lever-actuated disk moving said field producing means to positions spaced from the neck section of the cathode ray tube.

4. Yoke apparatus for a cathode ray tube having a neck section through which cathode ray beams pass, said apparatus including in combination, a support frame having a circular opening and adapted to be positioned on the neck section of the cathode ray tube, a plurality of brackets slidably mounted around said circular opening of said support frame, a plurality of convergence field producing means each mounted on one of said brackets, a manually rotatable disk supported around said circular opening and having a plurality of cam sections around the periphery thereof, each of said brackets having a projecting portion engageable with one of said cam sections of said rotatable disk, and spring means for biasing said brackets toward said circular opening with said field producing means in close proximity to the neck section of the cathode ray tube, so that manual rotation of said disk slides said convergence field producing means to positions spaced from the neck section.

5. Yoke apparatus for a cathode ray tube having a neck section through which cathode ray beams pass, said apparatus including in combination an apertured support plate having a circular opening with a flanged section thereabout and adapted to be positioned around the neck section of the cathode ray tube, a plurality of U-shaped brackets slidably mounted in spaced relation around said circular opening and having peg members extending through apertures in said support plate, a plurality of coil-core units adapted to produce beam convergence fields each mounted on one of said brackets, a manually rotatable disc having a circular aperture therein and supported on said flanged section thereby, said disc having a plurality of cam sections around the periphery thereof, said cam sections each being engageable with one of said peg members of said U-shaped brackets, plate means for retaining said disc on said flanged section in rotatable relation therewith, and a plurality of springs connected to said U-shaped brackets for biasing said coil core units toward said circular opening and into operative engagement with the neck section of the cathode ray tube, whereby manual rotation of said disc causes engagement of said cam sections with said peg members to move said coil-core units into a position spaced from the neck section of the cathode ray tube.

References Cited in the file of this patent

UNITED STATES PATENTS

| | | |
|---|---|---|
| 2,541,446 | Trott | Feb. 13, 1951 |
| 2,591,159 | Kabuss | Apr. 1, 1952 |
| 2,611,003 | Friend | Sept. 16, 1952 |
| 2,635,204 | Wandrey | Apr. 14, 1953 |
| 2,707,248 | Goodrich | Apr. 26, 1955 |